United States Patent
Chang

(10) Patent No.: US 7,257,055 B2
(45) Date of Patent: Aug. 14, 2007

(54) METHOD AND RELATED APPARATUS FOR DIAGNOSING CROSSTALK WITHIN AN OPTICAL PICK-UP UNIT BY UTILIZING FIRMWARE

(75) Inventor: Ricky Chang, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 712 days.

(21) Appl. No.: 10/709,410

(22) Filed: May 3, 2004

(65) Prior Publication Data

US 2005/0036410 A1 Feb. 17, 2005

(30) Foreign Application Priority Data

Aug. 11, 2003 (TW) ............... 92121980 A

(51) Int. Cl.
*G11B 7/00* (2006.01)
(52) U.S. Cl. .................. 369/44.34; 369/44.29
(58) Field of Classification Search ............ 369/44.34, 369/44.29, 44.27, 44.26, 44.32, 44.14, 44.35, 369/30.17, 30.15, 53.34, 47.49, 53.19, 32.01, 369/30.22
See application file for complete search history.

(56) References Cited

U.S. PATENT DOCUMENTS

| 5,870,356 A * | 2/1999 | Ikeda ............ 369/30.15 |
| 5,953,296 A * | 9/1999 | Baba ............ 369/44.32 |
| 7,196,979 B2 * | 3/2007 | Kadlec et al. ...... 369/44.27 |

* cited by examiner

*Primary Examiner*—Ali Neyzari
(74) *Attorney, Agent, or Firm*—Winston Hsu

(57) ABSTRACT

A method and a related apparatus for diagnosing crosstalk within an optical pick-up unit by utilizing firmware. The method includes calculating a tracking driving signal and a focusing driving signal according to a tracking error signal and a focusing error signal respectively, adding a noise to the focusing driving signal to form a test focusing driving signal through executing firmware, driving an optical pick-up unit by the tracking driving signal and the test focusing driving signal, and diagnosing characteristics of the pick-up unit through observing the tracking error signal.

20 Claims, 8 Drawing Sheets

METHOD AND RELATED APPARATUS FOR DIAGNOSING CROSSTALK WITHIN AN OPTICAL PICK-UP UNIT BY UTILIZING FIRMWARE

BACKGROUND OF INVENTION

1. Field of the Invention

The present invention relates to a method and a related apparatus for diagnosing an optical disk drive. In particular, the present invention discloses a method and a related apparatus for diagnosing crosstalk within an optical pick-up unit by utilizing firmware of the optical disk drive.

2. Description of the Prior Art

Please refer to FIG. 1, which is a block diagram of a prior art optical disk drive 10. The optical disk drive 10 is used for reading data stored on an optical disk 11. The optical disk drive 10 has an optical pick-up unit (OPU) 12, a spindle motor 14, a motor controller 16, a focusing controller 18, a tracking controller 20, a microprocessor 22, a servo system 24, and a signal converter 26. The OPU 12 emits a laser Li with a predetermined wavelength and predetermined power to the optical disk 11. It is well-known that spiral track 28 is formed on the optical disk 11. In addition, the track 28 records a plurality of lands and pits with different lengths for storing eight-to-fourteen modulation (EFM) data. For example, the land corresponds to the low logic value "0", and the pit corresponds to the high logic value "1". In addition, when the laser Li spots the pits and lands on the track 28, the laser Li is modulated by the pits and lands to generate a reflecting laser Lr. The magnitude of the reflecting laser Lr generated from the laser Li spotting the land is greater than the magnitude of the reflecting laser Lr generated from the laser Li spotting the pit. Therefore, the OPU 12 is capable of detecting the reflecting laser Lr to generate a corresponding analog electric signal EFMa. Then, the signal converter 26 transforms the analog electric signal EFMa into a digital electric signal EFMd. In the end, the microprocessor 22 decodes the received digital electric signal EFMd to obtain wanted data DATA stored on the optical disk 11.

In addition, when the optical disk 11 is loaded into the optical disk drive 10, the microprocessor 22 drives the motor controller 16 to adjust rotation speed associated with a spindle of the spindle motor 14, and the microprocessor 22 also drives the servo system 24 to control the position of the OPU 12 corresponding to the optical disk 11. As mentioned above, the OPU 12 adopts the optical means to retrieve the data recorded by the track 28. Therefore, if the laser Li cannot be precisely focused on the track 28, the electric signal EFMa generated from the OPU 12 contains erroneous information. Similarly, if the laser Li forms a spot on the optical disk 11, and the location of the spot is deviated from the target track 28, the electric signal EFMa generated from the OPU 12 contains incorrect information. Therefore, when the OPU 12 is operating, the OPU 12 generates a focusing error signal FEO and a tracking error signal TEO. Then, the focusing controller 18 calculates a focusing driving signal FOO to the servo system 24 according to the focusing error signal FEO, and the tracking controller 20 calculates a tracking driving signal TRO to the servo system 24 according to the tracking error signal TEO. Thus, the servo system 24 is capable of moving the OPU 12 vertically for adjusting a vertical gap between the OPU 12 and the optical disk 11 through the focusing driving signal FOO, and is capable of moving the OPU 12 horizontally for adjusting a horizontal displacement of the OPU 12 above the optical disk 11 through the tracking driving signal TRO.

From the above description, it is understood that the focusing operation and the tracking operation for the OPU 12 greatly affect accuracy of the final electric signal EFMa. If the signal quality of the electric signal EFMa is bad, the wanted data DATA cannot be correctly obtained even if the microprocessor 22 enables an error correction mechanism. Therefore, the OPU 12 has to accurately generate the focusing error signal FEO and the tracking error signal TEO. Otherwise, the focusing controller 18 and the tracking controller 20 are unable to figure out the wanted tracking driving signal TRO and the focus driving signal FOO. In other words, the servo system 24 cannot move the OPU 12 to a correct position for retrieving data recorded on the track 28 of the optical disk 11.

Before the optical disk drives 10 leave the factory, component characteristic of the OPU 12 need to be carefully tested to filter out optical disk drives 10 having abnormal OPUs 12. Please refer to FIG. 2, which is a diagram of a prior art optical disk drive diagnosing system 40. The diagnosing system 40 includes the optical disk drive 10 shown in FIG. 1, a dynamic signal analyzer 42 (HP35670A for example), and a mixer 44. The optical disk drive 10 shown in FIG. 2 only contains the OPU 12, the focusing controller 18, the tracking controller 20, and the servo system 24 for simplicity. Input ports A, B of the dynamic signal analyzer 42 are respectively connected to the OPU 12 and the focusing controller 18. That is, the tracking error signal TEO outputted from the OPU 12 is passed to the input port A of the dynamic signal analyzer, and the focusing driving signal FOO calculated by the focusing controller 18 is delivered to the input port B of the dynamic signal analyzer 42. In addition, an output port C of the dynamic signal analyzer 42 outputs a testing signal TEST to the mixer 44. The testing signal TEST functions as a noise to interfere with the focusing driving signal FOO calculated by the focusing controller 18. As shown in FIG. 2, the mixer 44 finally mixes the focusing driving signal FOO and the testing signal TEST, and outputs a test focusing driving signal FOO" to the servo system 24. The testing signal TEST generated from the dynamic signal analyzer 42 is used for simulating a noise, and is generally a sine wave with a frequency gradually increased from an initial value toward a target value. At the same time, the test focusing driving signal FOO" influenced by the testing signal TEST is inputted into the servo system 24. Then, the servo system 24 adjusts a vertical gap between the OPU 12 and the target track 28 of the optical disk 11 according to the test focusing driving signal FOO". With an appropriate adjustment, the laser emitted from the OPU 12 is capable of focusing on the track 28 of the optical disk 11. When the frequency of the testing signal TEST varies from the initial value toward the target value for affecting the focusing driving signal FOO, a user can use the tracking error signal TEO and the focusing driving signal FOO respectively received at input ports A, B of the dynamic signal analyzer 42 for analyzing a frequency response associated with the focusing driving signal FOO and the tracking error signal TEO.

Please refer to FIG. 3 in conjunction with FIG. 4. FIG. 3 is a first frequency response diagram associated with the focusing driving signal FOO and the tracking error signal TEO, and FIG. 4 is a second frequency response diagram associated with the focusing driving signal FOO and the tracking error signal TEO. In FIG. 3 and FIG. 4, the horizontal axis stands for the frequency, and the vertical axis stands for the gain. The response curve L2 shown in FIG. 4 corresponds to a standard OPU 12, and the response curve L1 shown in FIG. 3 corresponds to a flawed OPU 12. It is obvious that when the frequency of the testing signal TEST is greater than 10 KHz, the gains corresponding to the response curve L1 are greatly deviated from the gains corresponding to the response curve L2. Taking the frequency F for example, the gain, which corresponds to the frequency F, is equal to 25 through the response curve L1. However, the gain, which corresponds to the frequency F, is equal to 45 through the response curve L2. In other words, the crosstalk inherent to the flawed OPU 12 seriously affects the tracking error signal TEO and the focusing error signal FEO. Therefore, the tracking error signal TEO generated from the OPU 12 is introduced to the focusing error signal FEO generated from the OPU 12, and the unwanted interference couples with the focusing error signal FEO. Similarly, the focusing error signal FEO generated from the OPU 12 is introduced to the tracking error signal TEO generated from the OPU 12, and the unwanted interference couples with the tracking error signal TEO. The OPU 12 with serious crosstalk effect can be filtered out through observing the frequency response associated with the focusing driving signal FOO and the tracking error signal TEO or observing the frequency response associated with the tracking driving signal TRO and the focusing error signal FEO.

In order to diagnose characteristics of the OPU 12, a tester needs an external dynamic signal analyzer 42 and an external mixer 44 shown in FIG. 2. In addition, the dynamic signal analyzer 42 needs to be connected to the OPU 12 and the focusing controller 18, and the mixer 44 needs to be connected to the dynamic signal analyzer 42, the focusing controller 18, and the servo system 24. Concerning the optical disk drivers 10 waiting to be tested, the complicated connection shown in FIG. 2 is repeatedly established for diagnosing the characteristic of the OPU 12 within each optical disk driver 10. When mass production of the optical disk drive 10 begins, the prior art quality assurance (QA) procedure greatly slows actual yield of the optical disk drive 10 owing to the above-mentioned complicated testing mechanism.

SUMMARY OF INVENTION

The invention provides a method and a related apparatus for diagnosing crosstalk within an optical pick-up unit by utilizing firmware of the optical disk drive.

Briefly summarized, a preferred embodiment of the present invention provides a method for diagnosing an optical disk drive. The claimed method includes utilizing an optical pick-up unit for outputting an incident laser to a track on an optical disk and reading a reflecting laser modulated by the track for generating a tracking error signal and a focusing error signal, calculating a tracking driving signal according to the tracking error signal, calculating a focusing driving signal according to the focusing error signal, utilizing a firmware of the optical disk drive for mixing a noise with the focusing driving signal to generate a test focusing driving signal, adjusting a position of the optical pick-up unit corresponding to the optical disk according to the test focusing driving signal and the tracking driving signal, and determining whether the focusing error signal outputted from the optical pick-up unit interferes with the tracking error signal outputted from the optical pick-up unit according to the tracking error signal.

A preferred embodiment of the present invention also provides a method for diagnosing an optical disk drive. The claimed method includes utilizing an optical pick-up unit for outputting an incident laser to a track on an optical disk and reading a reflecting laser modulated by the track for generating a tracking error signal and a focusing error signal, calculating a tracking driving signal according to the tracking error signal, calculating a focusing driving signal according to the focusing error signal, utilizing a firmware of the optical disk drive for mixing a noise with the tracking driving signal to generate a test tracking driving signal, adjusting a position of the optical pick-up unit corresponding to the optical disk according to the test tracking driving signal and the focusing driving signal, and determining whether the tracking error signal outputted from the optical pick-up unit interferes with the focusing error signal outputted from the optical pick-up unit according to the focusing error signal.

The preferred embodiment of the present invention provides an optical disk drive. The claimed optical disk drive comprises an optical pick-up unit for outputting an incident laser to a track on an optical disk and reading a reflecting laser modulated by the track for generating a tracking error signal and a focusing error signal, a focusing controller for calculating a focusing driving signal according to the focusing error signal, a tracking controller for calculating a tracking driving signal according to the tracking error signal, a memory for storing a noise processing program, a microprocessor electrically connected to the memory for running the noise processing program to mix a noise with the focusing driving signal to generate a test focusing driving signal, and a servo system electrically connected to the microprocessor and the tracking controller for adjusting a position of the optical pick-up unit corresponding to the optical disk according to the test focusing driving signal and the tracking driving signal.

The preferred embodiment of the present invention provides an optical disk drive. The optical disk drive comprises an optical pick-up unit for outputting an incident laser to a track on an optical disk and reading a reflecting laser modulated by the track for generating a tracking error signal and a focusing error signal, a focusing controller for calculating a focusing driving signal according to the focusing error signal, a tracking controller for calculating a tracking driving signal according to the tracking error signal, a memory for storing a noise processing program, a microprocessor electrically connected to the memory for running the noise processing program to mix a noise with the tracking driving signal to generate a test tracking driving signal, and a servo system electrically connected to the microprocessor and the tracking controller for adjusting a position of the optical pick-up unit corresponding to the optical disk according to the test tracking driving signal and the focusing driving signal.

It is an advantage of the present invention that the claimed optical disk drive utilizes the digital signal processing means to impose the noise upon either the focusing driving signal or the tracking driving signal. Because the generic optical disk drive commonly has a firmware, the claimed invention only needs to modify the firmware, and adds the noise processing program and other programs that process the noise to the firmware. In addition, when the behavior of the optical pick-up unit is being diagnosed, the microprocessor embedded in the optical disk drive is capable of running the noise processing program of the firmware. Therefore, the claimed optical disk drive does not need to establish complicated connections to connect external diagnosing equipment. Therefore, the claimed optical disk drive is capable of diagnosing its installed optical pick-up unit quickly.

These and other contents of the present invention will no doubt become obvious to those of ordinary skill in the art after reading the following detailed description of the preferred embodiment, which is illustrated in the various figures and drawings.

DETAILED DESCRIPTION

Figure 1:
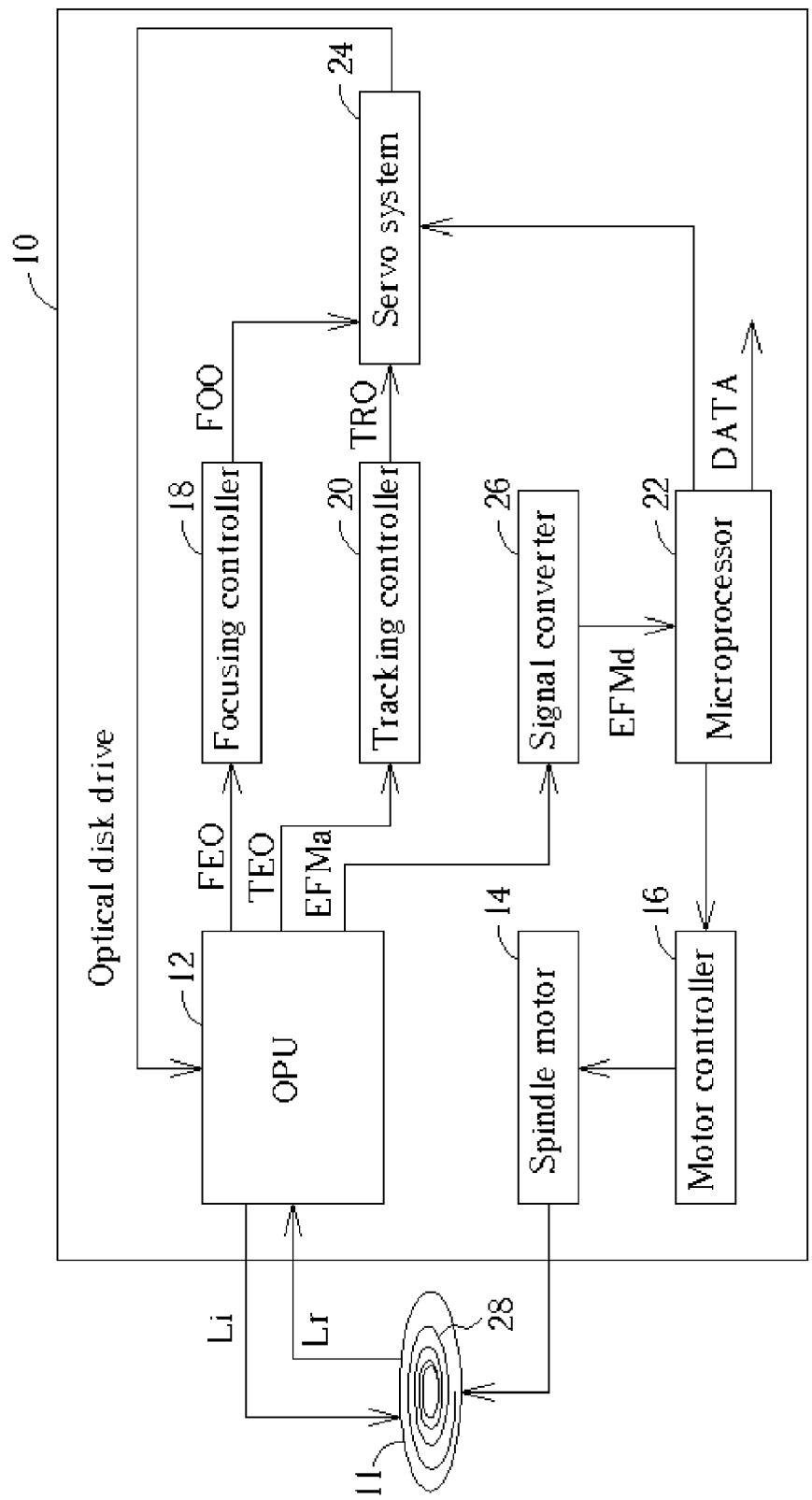
FIG. 1 is a block diagram of a prior art optical disk drive.
Figure 2:
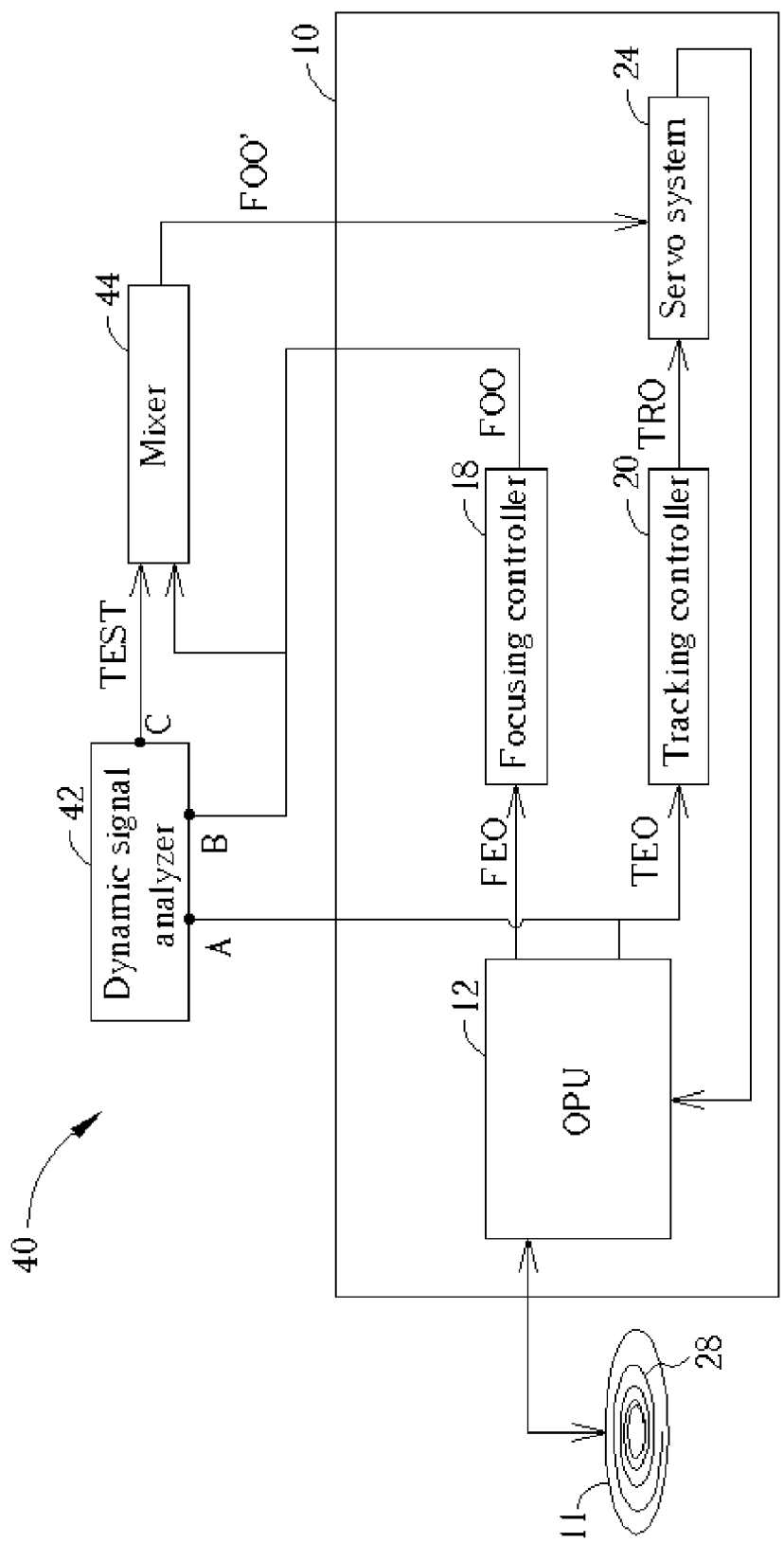
FIG. 2 is a diagram of a prior art optical disk drive diagnosing system.
Figure 3:
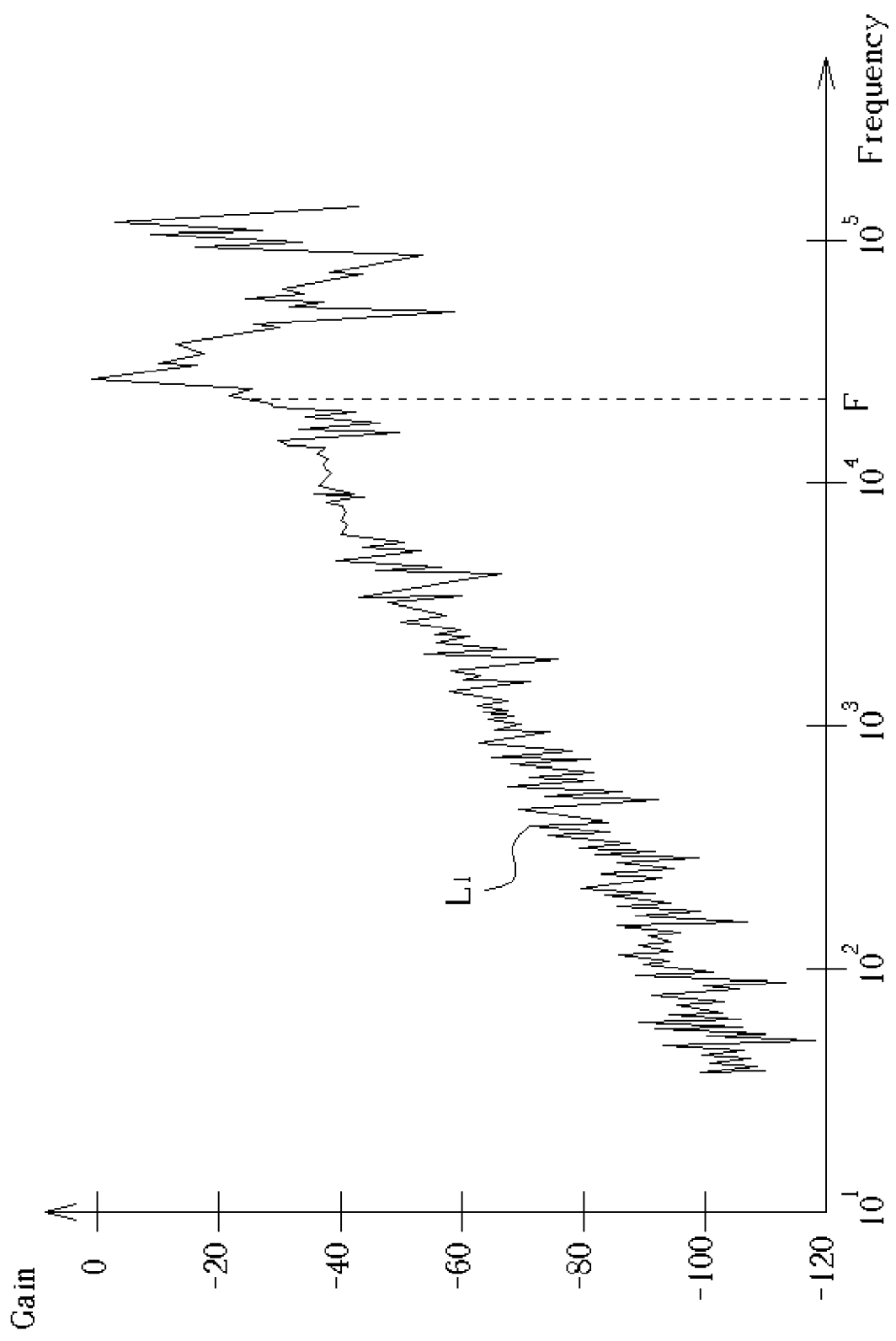
FIG. 3 is a first frequency response diagram associated with a focusing driving signal and a tracking error signal.
Figure 4:
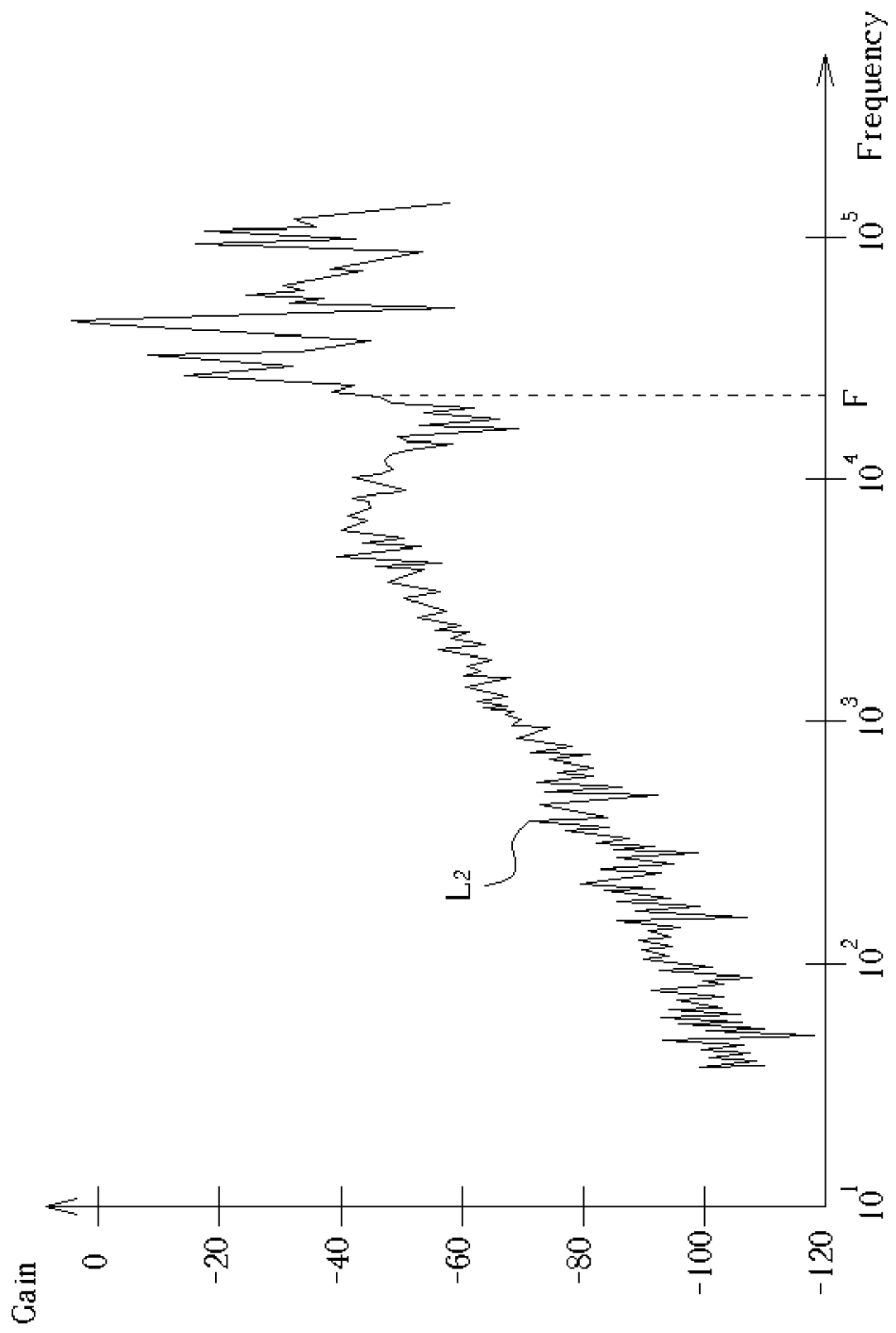
FIG. 4 is a second frequency response diagram associated with the focusing driving signal and the tracking error signal.
Figure 5:
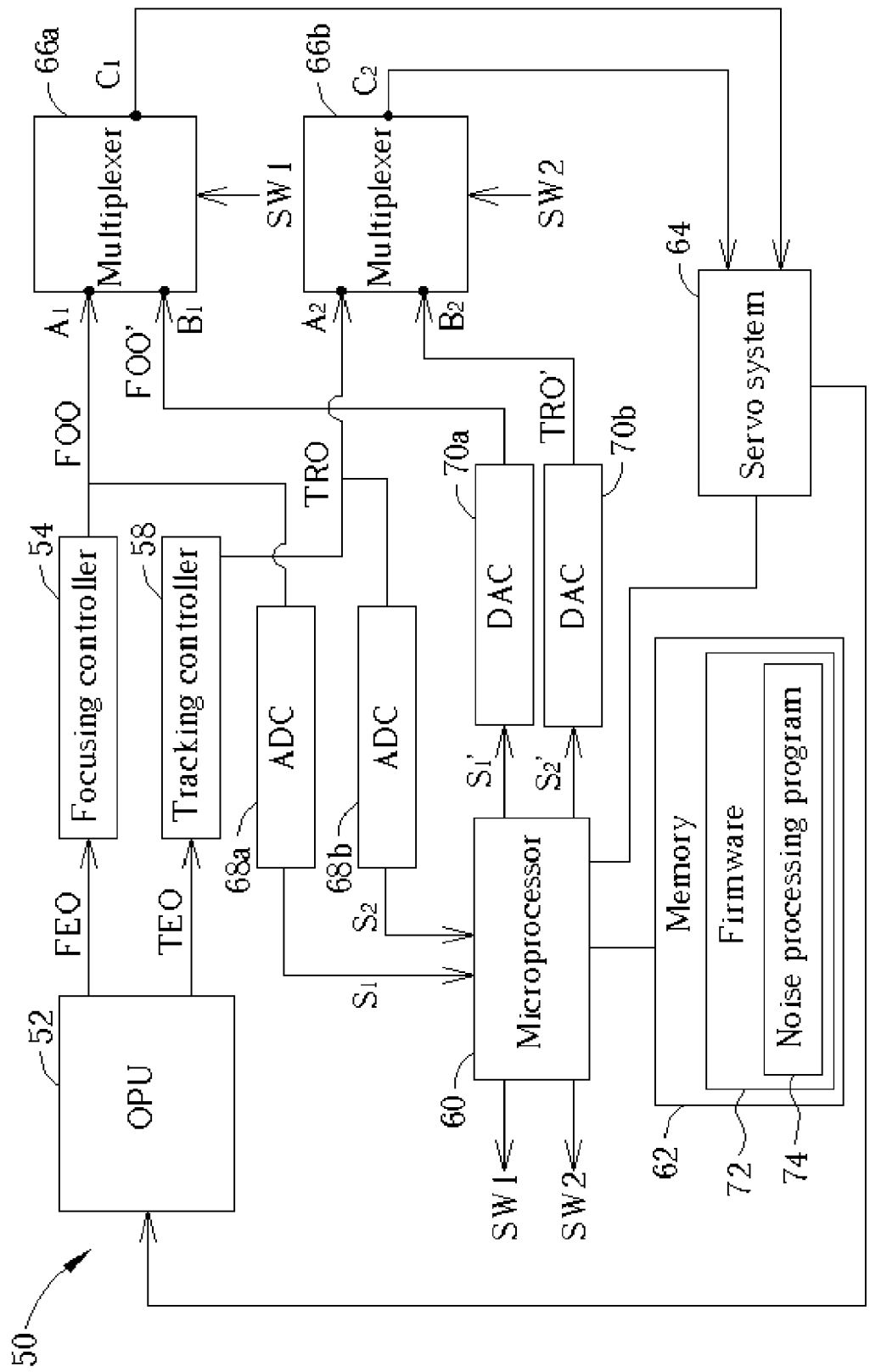
FIG. 5 is a block diagram of a first optical disk drive according to the present invention.

Please refer to FIG. 5, which is a block diagram of a first optical disk drive 50 according to the present invention. The optical disk drive 50 includes an optical pick-up unit (OPU) 52, a focusing controller 54, a tracking controller 58, a microprocessor 60, a memory 62, a servo system 64, two multiplexers 66a, 66b, two analog-to-digital converters (ADCs) 68a, 68b, and two digital-to-analog converters (DACs) 70a, 70b. The OPU 52 is used for outputting a laser to an optical disk and receiving a reflecting laser modulated through the optical disk. At the same time, the OPU 52 generates a focusing error signal FEO and a tracking error signal TEO according to the received reflecting laser. The focusing controller 54 is capable of generating a focusing driving signal FOO according to the focusing error signal FEO, and the tracking controller 58 is capable of generating a tracking driving signal TRO according to the tracking error signal TEO. For example, each of the focusing controller 54 and the tracking controller 58 has an amplifier and a compensator. Concerning the focusing controller 54, its amplifier amplifies the amplitude of the focusing error signal FEO. Because the amplitude of the focusing error signal FEO corresponds to a vertical gap error between the OPU 52 and the optical disk, the compensator determines how to adjust the vertical location of the OPU 52 according to a predetermined mapping function and the amplitude of the focusing error signal FEO, and outputs a focusing driving signal FOO. Regarding the tracking controller 58, it operates according to the same means mentioned above. That is, its amplifier amplifies the amplitude of the tracking error signal TEO. Because the amplitude of the tracking error signal TEO corresponds to horizontal location error of the OPU 52 above the optical disk, the compensator determines how to adjust the horizontal location of the OPU 52 according to a predetermined mapping function and the amplitude of the tracking error signal TEO, and outputs a tracking driving signal TRO. Then, the servo system 64 is capable of moving the OPU 52 vertically and horizontally according to the tracking driving signal TRO and the focusing driving signal TRO. The microprocessor 60 is used to control operations of the optical disk drive 50. For instance, the microprocessor 60 is a digital signal processor (DSP) that is capable of reading the firmware 72 stored in the memory 62. In the preferred embodiment, the memory 62 is a non-volatile memory (a flash memory for example). Therefore, after the power feeding the optical disk drive 50 is cut, the firmware 72 is still kept in the memory 62 without being flushed. Suppose that the optical disk drive 50 is installed on a computer host. The computer host itself only needs to output high-level control commands to the microprocessor 60 within the optical disk drive 50, and then the microprocessor 60 is capable of executing the received control commands to control corresponding operations of the optical disk drive 60 with the help of the firmware 72.

It is noteworthy that the focusing controller 54 in the preferred embodiment is electrically connected to a multiplexer 66a and an ADC 68a. In addition, the tracking controller 58 is similarly connected to a multiplexer 66b and an ADC 68b. The ADC 68a is used to convert the focusing driving signal FOO into a corresponding digital focusing driving signal S1, and delivers the digital focusing driving signal S1 to the microprocessor 60. Similarly, the ADC 68b is used to convert the tracking driving signal TRO into a corresponding digital tracking driving signal S2, and delivers the digital tracking driving signal S2 to the microprocessor 60. The firmware 72 in the preferred embodiment has a noise processing program 74 for imposing a predetermined noise (a sine wave for example) on the digital focusing driving signal S1 to generate a test focus driving signal S1'. In addition, the noise processing program 74 also can impose a predetermined noise such as a sine wave on the digital tracking driving signal S2 to generate a test tracking driving signal S2.

As shown in FIG. 5, after the microprocessor 60 computes the test focusing driving signal S1', a DAC 70a converts the digital test focusing driving signal S1' into an analog test focusing driving signal FOO', and passes the test focusing driving signal FOO' to the multiplexer 66a. Similarly, after the microprocessor 60 computes the test tracking driving signal S2', a DAC 70b converts the digital test tracking driving signal S2' into an analog test tracking driving signal TRO', and passes the test tracking driving signal TRO' to the multiplexer 66b. The multiplexer 66a has two input ports A1, B1, and an output port C1. In addition, a control signal SW1 is used to control the output port C1 being electrically connected to either the input port A1 or the input port B1. Another multiplexer 66b also has two input ports A2, B2, and an output port C2. In addition, a control signal SW2 is used to control the output port C2 being electrically connected to either the input port A2 or the input port B2.

When the characteristic of the OPU 52 is diagnosed, the microprocessor 60 reads the noise processing program 74, runs the retrieved noise processing program 74, and outputs appropriate control signals SW1, SW2 to multiplexers 66a, 66b for adjusting internal transmission routes of the multiplexers 66a, 66b. In other words, with the control of the transmission routes within the multiplexer 66a, the vertical movement of the OPU 52 is driven by one driving signal selected from the focusing driving signal FOO and the test focusing driving signal FOO'. By the same means, the horizontal movement of the OPU 52 is driven by one driving signal selected from the tracking driving signal TRO and the test tracking driving signal TRO with the control of the transmission routes within the multiplexer 66b.

Figure 6:
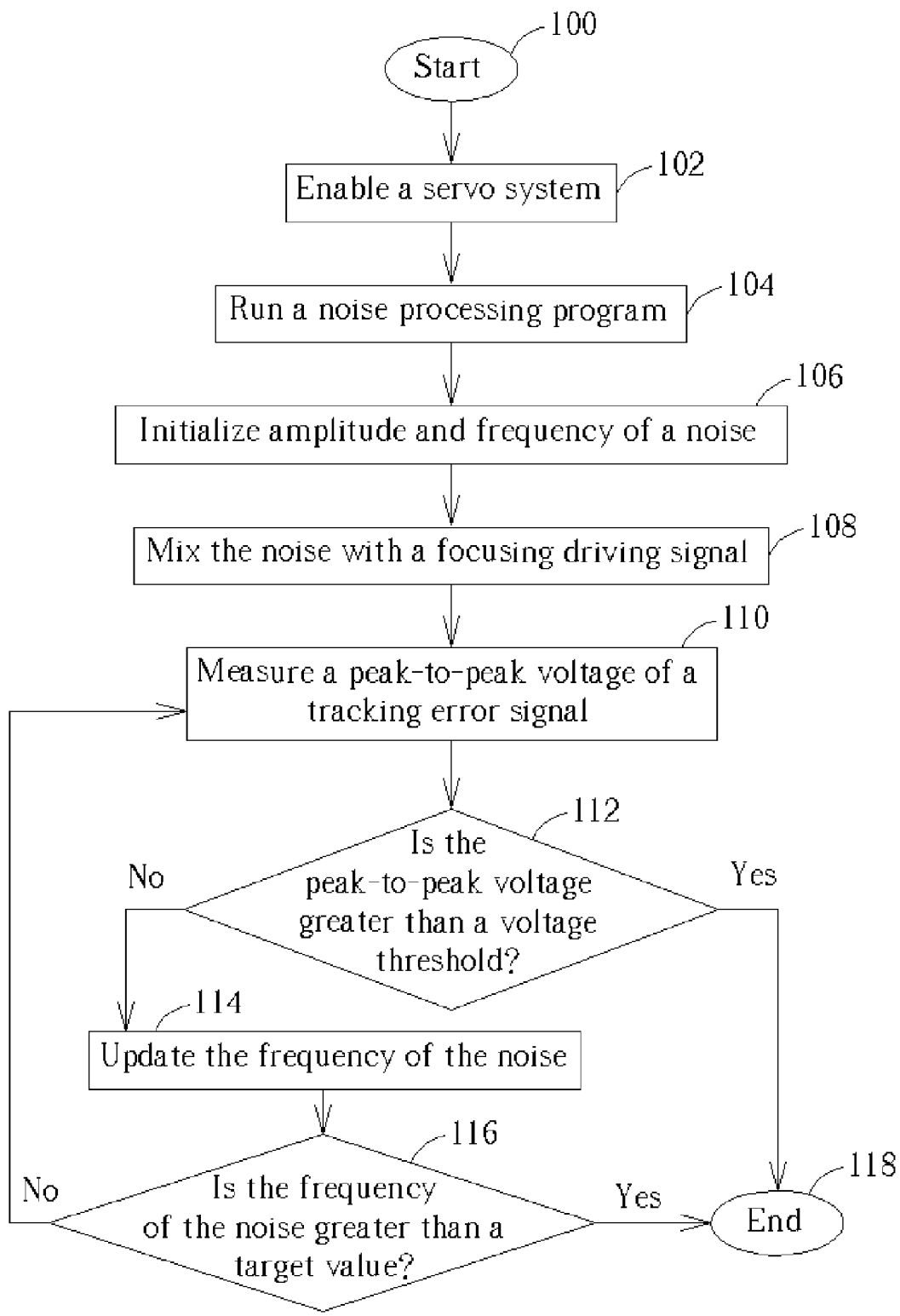
FIG. 6 is a flow chart illustrating a first diagnosing process for an optical pick-up unit shown in FIG. 5.

Please refer to FIG. 6, which is a flow chart illustrating a first diagnosing process for the OPU 52 shown in FIG. 5. The process of diagnosing the OPU 52 includes following steps.

Step 100: Start.

Step 102: After the optical disk drive 50 is powered on, and an optical disk is loaded into the optical disk drive 50, the microprocessor 60 enables the servo system 64.

Step 104: The microprocessor 60 reads the noise processing program 74 and runs the noise processing program 74.

Step 106: The microprocessor 60 determines initial values of the amplitude and frequency of a noise through the noise processing program 74.

Step 108: The microprocessor 60 runs the noise processing program 74 to mix the noise with the focusing driving signal S1 inputted into the microprocessor 60, and generates the test focusing driving signal S1.

Step 110: Measure a peak-to-peak voltage of a tracking error signal TEO outputted from the OPU 52.

Step 112: Determine if the peak-to-peak voltage is greater than a voltage threshold. If so, go to step 118; otherwise, go to step 114.

Step 114: Update the frequency of the noise.

Step 116: Determine if the frequency of the noise is greater than a target value. If yes, go to step 118; otherwise, go back to step 110.

Step 118: End.

The detailed operation of diagnosing the OPU 52 is described as follows. When the optical disk drive 50 is powered on, operating voltages are successfully delivered to components (the OPU 52 and the microprocessor 60 for example) within the optical disk drive 50. Then, each of the components can function normally. After putting a test optical disk into the optical disk drive 50, a tester is capable of inputting a control command to the microprocessor 60 for moving the OPU 52 to a predetermined track location on the inserted optical disk. Therefore, the microprocessor runs the firmware 72 according to the received control command for enabling the servo system 64 to move the OPU 52 (step 102). Please note that the OPU 52 outputs the focusing error signal FEO and the tracking error signal TEO for further tuning position of the OPU 52 after the OPU 52 is moved to the predetermined track location. At the same time, the focusing controller 54 and the tracking controller 58 are also enabled to generate the focusing driving signal FOO and the tracking driving signal TRO. In addition, the microprocessor 60 outputs control signals SW1, SW2 for controlling the input port A1 of the multiplexer 66a electrically connected to the output port C1 of the multiplexer 66a and controlling the input port A2 of the multiplexer 66b electrically connected to the output port C2 of the multiplexer 66b. Therefore, the servo system 64 still uses the focusing driving signal FOO and the tracking driving signal TRO to adjust the position of the OPU 52.

Then, the tester inputs another control command to the microprocessor 60 for commanding the microprocessor 60 to run the noise processing program 74. After the microprocessor 60 reads the noise processing program 74, and runs the noise processing program 74, the control signals SW1, SW2 outputted from the microprocessor 60 now is used for driving the multiplexers 66a, 66b to make the input port B1 electrically connected to the output port C1 and the input port A2 still electrically connected to the output port C2 (step 104).

The noise processing program 74 sets parameters associated with a noise. The noise is mixed with the focusing driving signal S1, which corresponds to the focusing driving signal FOO. The preferred embodiment utilizes a sine wave to function as the noise used for diagnosing the OPU 52. That is, when the noise processing program 74 is run, the noise processing program 74 initializes the amplitude and frequency of the sine wave first (step 106). In addition, the preferred embodiment tests characteristics of the OPU 52 with the frequency of the noise limited within a frequency range. Therefore, the initial value for the frequency of the noise can be set to a minimum value of the frequency range, and a target value for the frequency of the noise can be set to a maximum value of the frequency range. Please note that the initial value for the frequency of the noise is capable of being set to the maximum value of the frequency range, and the target value for the frequency of the noise capable of being set to the minimum value of the frequency range. In addition, the noise used in the present invention is not limited to being a sine wave. Therefore, signals with any waveforms can be used to simulate the noise except the D.C. signal with fixed amplitude.

The noise processing program 74 mixes the sine wave with the focusing driving signal S1 through prior art digital signal processing, and then outputs the test focusing driving signal S1' (step 108). The DAC 70a further converts the test focusing driving signal S1' into the test focusing driving signal FOO'. Because the output port C1 of the multiplexer 66a is connected to the output port B1 of the multiplexer 66a, and the output port C2 of the multiplexer 66b is connected to the output port A2 of the multiplexer 66a, the test focusing driving signal FOO' and the tracking driving signal TRO are inputted into the servo system 64 finally. Please note that the test focusing driving signal FOO' is influenced with the noise provided by the noise processing program 74, and the servo system 64 utilizes the test focusing driving signal FOO' and the tracking driving signal TRO to control the position of the OPU 52. Therefore, the crosstalk interference of the tracking error signal TEO outputted from the OPU 52, which is caused by the noise imposing on the focusing error signal FEO, is capable of being determined through detecting the tracking error signal TEO outputted from the OPU 52. In other words, the tester can measure the peak-to-peak voltage of the tracking error signal TEO to determine the magnitude of the induced interference (step 110). It is known from experiments that if the OPU 52 is seriously affected by the crosstalk, the generated tracking error signal TEO oscillates so that its peak-to-peak voltages becomes greater than a voltage threshold. On the contrary, concerning the ideal OPU 52, the outputted tracking signal TEO does not oscillate to make its peak-to-peak voltage greater than the voltage threshold. Therefore, the goal of filtering out the flawed OPU 52 is achieved through comparing the measured peak-to-peak voltage with the voltage threshold (step 112). That is, if the peak-to-peak voltage of the tracking error signal TEO becomes greater than the voltage threshold, the behavior of the tested OPU 52 is bad. Otherwise, the noise processing program 74 updates the frequency of the noise for re-testing the behavior of the OPU 52 (step 114).

If the initial value for the frequency of the sine wave is set to the minimum value of the frequency range, the noise processing program 74 increases the frequency of the sine wave. On the contrary, if the initial value for the frequency of the sine wave is set to the maximum value of the frequency range, the noise processing program 74 decreases the frequency of the sine wave. The preferred embodiment diagnoses the OPU 52 with the sine wave having the frequency within the frequency range. When the frequency of the sine wave is outside the frequency range, it means that the diagnosing process for the OPU 52 is finished. However, if the frequency of the sine wave is still inside the frequency range, the noise processing program 74 continuously updates the frequency of the noise to interfere with the focusing driving signal S1 until the frequency of the sine wave is outside the frequency range.

Figure 7:
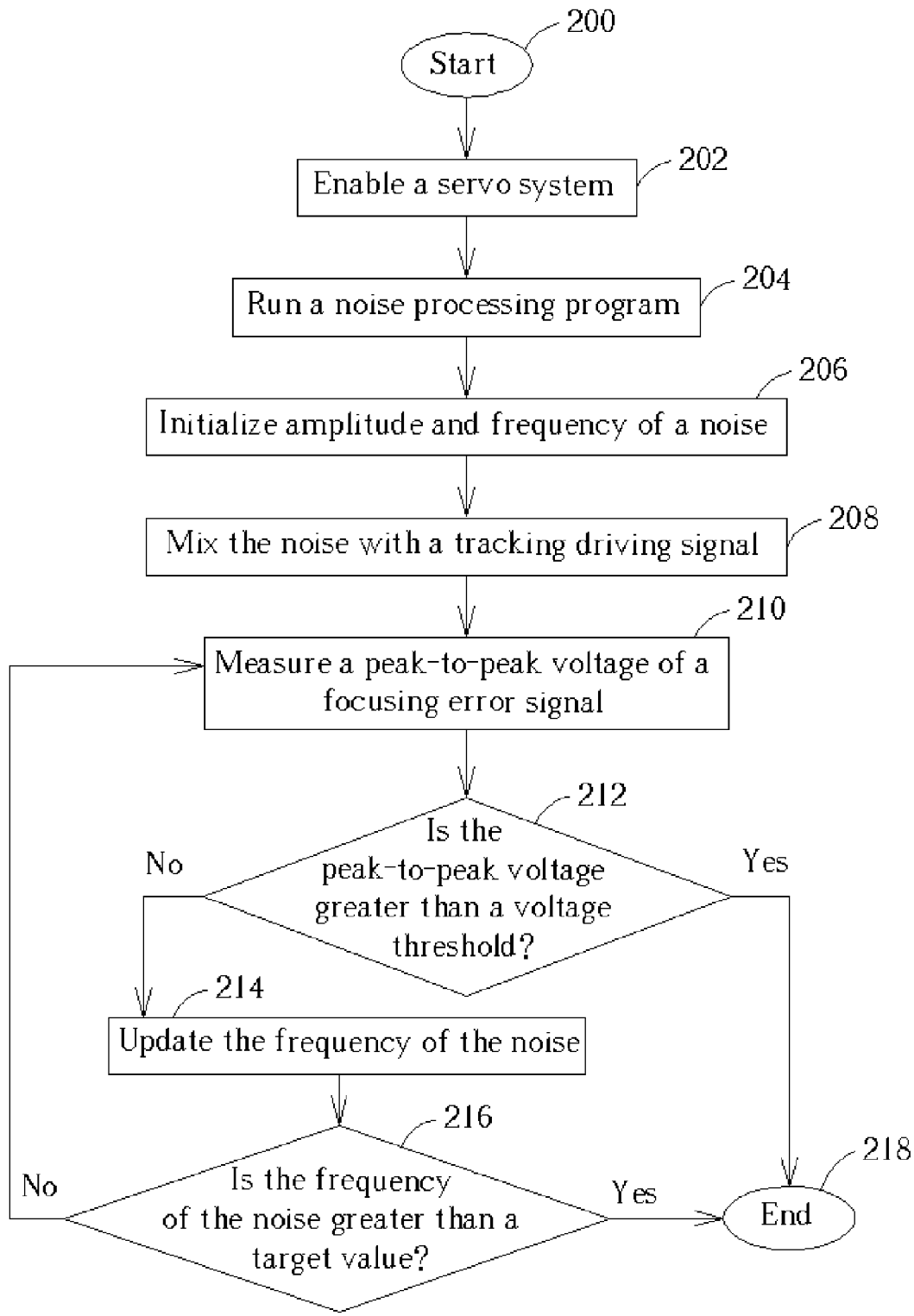
FIG. 7 is a flow chart illustrating a second diagnosing process for the optical pick-up unit shown in FIG. 5.

Please refer to FIG. 7, which is a flow chart illustrating a second diagnosing process for the OPU 52 shown in FIG. 5. The process of diagnosing the OPU 52 includes following steps.

Step 200: Start.

Step 202: After the optical disk drive 50 is powered on, and an optical disk is loaded into the optical disk drive 50, the microprocessor 60 enables the servo system 64.

Step 204: The microprocessor 60 reads the noise processing program 74 and runs the noise processing program 74.

Step 206: The microprocessor 60 determines initial values of the amplitude and frequency of a noise through the noise processing program 74.

Step 208: The microprocessor 60 runs the noise processing program 74 to mix the noise with the tracking driving signal S2 inputted into the microprocessor 60, and generates the test tracking driving signal S2.

Step 210: Measure a peak-to-peak voltage of a focusing error signal FEO outputted from the OPU 52.

Step 212: Determine if the peak-to-peak voltage is greater than a voltage threshold. If so, go to step 218; otherwise, go to step 214.

Step 214: Update the frequency of the noise.

Step 216: Determine if the frequency of the noise is greater than a target value. If so, go to step 218; otherwise, go back to step 210.

Step 218: End.

The operation of diagnosing the OPU 52 shown in FIG. 7 is similar to the operation of diagnosing the OPU 52 shown in FIG. 6. The main difference is that operations of the steps 204, 208, 210 are different from operations of the steps 104, 108, 110. The operations for the steps identical to that shown in FIG. 6 are not repeatedly described for simplicity because they have been described above. Regarding the step 204, the control signals SW1, SW2 outputted from the microprocessor 60 now are used for driving the multiplexers 66a, 66b to make the input port B2 electrically connected to the output port C2 and the input port A1 still electrically connected to the output port C1 after the microprocessor 60 reads and runs the noise processing program 74. In other words, after the noise processing program 74 runs, the servo system 64 controls the position of the OPU 52 according to the focusing driving signal FOO outputted from the focusing controller 54 and the test tracking driving signal TRO' outputted from the DAC 70b. In addition, concerning the steps 208, 210 shown in FIG. 7, the noise processing program 74 run by the microprocessor 60 mixes a noise (a sine wave for example) with the tracking driving signal S2 through prior art digital signal processing. Therefore, the test tracking driving signal TRO' is influenced with the noise provided by the noise processing program 74, and the servo system 64 utilizes the test tracking driving signal TRO' and the focusing driving signal FOO to control the position of the OPU 52. Therefore, the crosstalk interference of the focusing error signal FEO outputted from the OPU 52, which is caused by the noise imposing on the tracking error signal TEO, is capable of being determined through detecting the focusing error signal FEO outputted from the OPU 52. In other words, the tester can measure the peak-to-peak voltage of the focusing error signal FEO to determine the magnitude of the induced interference. Therefore, the goal of filtering out the flawed OPU 52 is achieved through comparing the measured peak-to-peak voltage with the voltage threshold.

Figure 8:
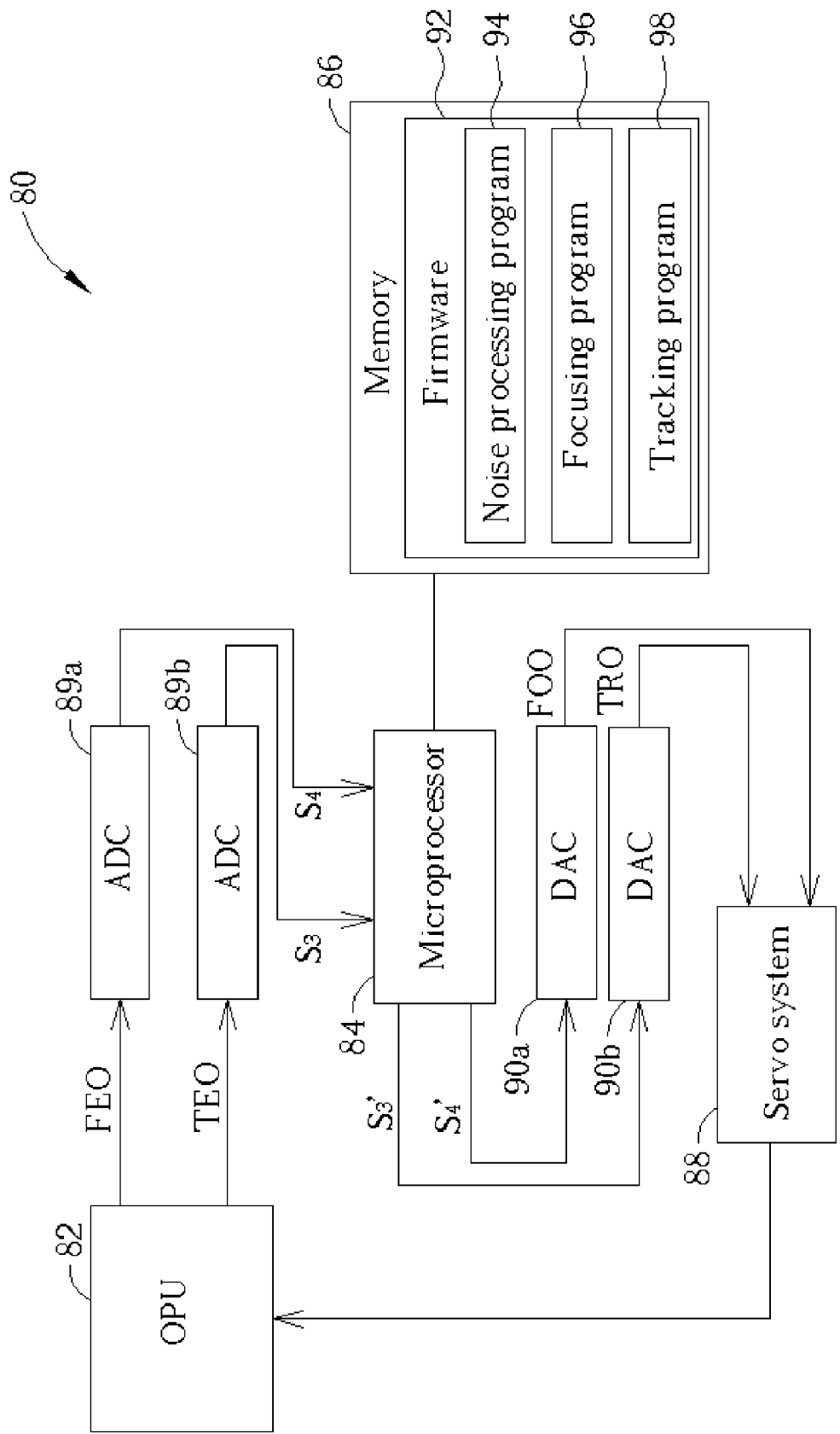
FIG. 8 is a block diagram of a second optical disk drive according to the present invention.

Please refer to FIG. 8, which is a block diagram of a second optical disk drive 80 according to the present invention. The optical disk drive 80 has an OPU 82, a microprocessor 84, a memory 86, a servo system 88, two ADCs 89a, 89b, and two DACs 90a, 90b. In addition, a firmware 92 is stored in the memory 86, and the firmware 92 includes a noise processing program 94, a focusing program 96, and a tracking program 98. The optical disk drive 80 shown in FIG. 8 is similar to the optical disk drive 50 shown in FIG. 5. The components in the optical disk drives 50, 80 having identical names correspond to the same functionality, and repeated description for the component in the optical disk drive 80 is skipped. The main difference between the optical disk drive 80 and the optical disk drive 50 is that the optical disk drive 80 utilizes software or so-called firmware (the focusing program 96 and the tracking program 98) to replace the hardware (the focusing controller 54 and the tracking controller 58) originally used in the optical disk drive 50. As shown in FIG. 8, the ADC 89a converts the focusing error signal FEO into a digital focusing error signal S3, and the ADC 89b converts the tracking error signal TEO into a digital tracking error signal S4. Therefore, the microprocessor 84 runs the focusing program 96 and the tracking program 98 in the firmware 92 to process the focusing error signal FEO and the tracking error signal TEO through digital signal processing, and then outputs corresponding focusing driving signal S3' and the tracking driving signal S4'. The DAC 90a is capable of converting the digital focusing driving signal S3' into a corresponding analog focusing driving signal FOO, and the DAC 90b is capable of converting the digital tracking driving signal S4' into a corresponding analog tracking driving signal TRO. In other words, when the optical disk drive 80 is activated, the microprocessor 84 loads the focusing program 96 and the tracking program 98. The focusing program 96 functions as the focusing controller 54, and the tracking program 98 functions as the tracking controller 58. The position of the OPU 82 through driving the servo system 88 is successfully controlled. For the optical disk drive 80, it adopts the digital signal processing means to control the focusing operation and the tracking operation associated with the OPU 82. Similarly, the optical disk drive 80 also adopts the digital signal processing means to diagnose the crosstalk inherent to the OPU 82. In other words, the diagnosing process for the OPU 82 is identical to the diagnosing process of the OPU 52 shown in FIG. 6 or FIG. 7. Therefore, the description for the diagnosing process of the optical disk drive 80 is not repeated.

In contrast to the prior art, the claimed optical disk drive utilizes the digital signal processing means to impose the noise upon the focusing driving signal. Then, the peak-to-peak voltage of the tracking error signal is measured to determine if the optical pick-up unit is critically affected by the well-known crosstalk. In addition, claimed optical disk drive also can utilize the digital signal processing means to impose the noise upon the tracking driving signal. Then, the peak-to-peak voltage of the focusing error signal is measured to determine if the optical pick-up unit is critically affected by the well-known crosstalk. Because the generic optical disk drive commonly has a firmware, the claimed invention only needs to modify the firmware, and adds the noise processing program and other programs that process the noise to the firmware. Then, The noise to the focusing driving signal or the tracking driving signal during diagnosing the optical disk drive is imposed. In addition, when the behavior of the optical pick-up unit is being diagnosed, the microprocessor embedded in the optical disk drive is capable of running the noise processing program of the firmware. Therefore, the claimed optical disk drive does not need to establish complicated connections to connect external diagnosing equipment (the dynamic signal analyzer for example). To sum up, the claimed optical disk drive is capable of diagnosing its installed optical pick-up unit quickly. The influence of the quality assurance (QA) on the yield of optical disk drives is alleviated owing to the greatly reduced diagnosing time.

The above description provides a full and complete description of the preferred embodiments of the present invention. Various modification, alternate construction, and equivalent may be made by those skilled in the art without changing the scope or spirit of the invention. Accordingly, the above description and illustrations should not be construed as limiting the scope of the invention which is defined by the following claims.

What is claimed is:

1. A method for diagnosing an optical disk drive comprising:
   (a) utilizing an optical pick-up unit for outputting an incident laser to a track on an optical disk and reading a reflecting laser modulated by the track for generating a tracking error signal and a focusing error signal;
   (b) calculating a tracking driving signal according to the tracking error signal, and calculating a focusing driving signal according to the focusing error signal;
   (c) utilizing a firmware of the optical disk drive for mixing a noise with the focusing driving signal to generate a test focusing driving signal;
   (d) adjusting a position of the optical pick-up unit corresponding to the optical disk according to the test focusing driving signal and the tracking driving signal; and
   (e) determining whether the focusing error signal outputted from the optical pick-up unit interferes with the tracking error signal outputted from the optical pick-up unit according to the tracking error signal.

2. The method of claim 1 wherein step (e) further comprises:
   detecting a peak-to-peak voltage of the tracking error signal for determining whether the focusing error signal outputted from the optical pick-up unit interferes with the tracking error signal outputted from the optical pick-up unit.

3. The method of claim 1 wherein the noise is a sine wave, step (c) utilizes the firmware to mix the sine wave with the focusing driving signal during a plurality of periods, the sine wave corresponds to different frequencies during the periods, and a frequency of the sine wave is limited within a predetermined frequency range.

4. The method of claim 3 wherein the frequency of the sine wave is gradually increased from a minimum value of the predetermined frequency range during the periods.

5. The method of claim 3 wherein the frequency of the sine wave is gradually decreased from a maximum value of the predetermined frequency range during the periods.

6. The method of claim 1 wherein the tracking error signal and the focusing error signal are analog signals, step (b) further comprises converting the focusing driving signal into a corresponding digital signal, and step (c) further comprises converting the test focusing driving signal into a corresponding digital signal.

7. The method of claim 1 wherein the tracking error signal and the focusing error signal are analog signals, step (b) further comprises converting the tracking error signal and the focusing error signal into corresponding digital signals, and running the firmware to calculate the tracking driving signal and the focusing driving signal, and step (c) further comprises converting the test focusing driving signal and the tracking driving signal into corresponding analog signals.

8. A method for diagnosing an optical disk drive comprising:
   (a) utilizing an optical pick-up unit for outputting an incident laser to a track on an optical disk and reading a reflecting laser modulated by the track for generating a tracking error signal and a focusing error signal;
   (b) calculating a tracking driving signal according to the tracking error signal, and calculating a focusing driving signal according to the focusing error signal;
   (c) utilizing a firmware of the optical disk drive for mixing a noise with the tracking driving signal to generate a test tracking driving signal;
   (d) adjusting a position of the optical pick-up unit corresponding to the optical disk according to the test tracking driving signal and the focusing driving signal; and
   (e) determining whether the tracking error signal outputted from the optical pick-up unit interferes with the focusing error signal outputted from the optical pick-up unit according to the focusing error signal.

9. The method of claim 8 wherein step (e) further comprises:
   detecting a peak-to-peak voltage of the focusing error signal for determining whether the tracking error signal outputted from the optical pick-up unit interferes with the focusing error signal outputted from the optical pick-up unit.

10. The method of claim 8 wherein the noise is a sine wave, step (c) utilizes the firmware to mix the sine wave with the tracking driving signal during a plurality of periods, the sine wave corresponds to different frequencies during the periods, and a frequency of the sine wave is limited within a predetermined frequency range.

11. The method of claim 10 wherein the frequency of the sine wave is gradually increased from a minimum value of the predetermined frequency range during the periods.

12. The method of claim 10 wherein the frequency of the sine wave is gradually decreased from a maximum value of the predetermined frequency range during the periods.

13. The method of claim 8 wherein the tracking error signal and the focusing error signal are analog signals, step (b) further comprises converting the tracking driving signal into a corresponding digital signal, and step (c) further comprises converting the test tracking driving signal into a corresponding digital signal.

14. The method of claim 8 wherein the tracking error signal and the focusing error signal are analog signals, step (b) further comprises converting the tracking error signal and the focusing error signal into corresponding digital signals, and running the firmware to calculate the tracking driving signal and the focusing driving signal, and step (c) further comprises converting the test tracking driving signal and the focusing driving signal into corresponding analog signals.

15. An optical disk drive comprising:
   an optical pick-up unit for outputting an incident laser to a track on an optical disk and reading a reflecting laser modulated by the track for generating a tracking error signal and a focusing error signal;
   a focusing controller for calculating a focusing driving signal according to the focusing error signal;
   a tracking controller for calculating a tracking driving signal according to the tracking error signal;

a memory for storing a noise processing program;

a microprocessor electrically connected to the memory for running the noise processing program to mix a noise with the focusing driving signal to generate a test focusing driving signal; and a servo system electrically connected to the microprocessor and the tracking controller for adjusting a position of the optical pick-up unit corresponding to the optical disk according to the test focusing driving signal and the tracking driving signal.

16. The optical disk drive of claim 15 wherein the focusing controller and the tracking controller are hardware circuits, and are respectively connected to the optical pick-up unit.

17. The optical disk drive of claim 15 wherein the focusing controller and the tracking controller are software programs run by the microprocessor, and the noise processing program, the focusing controller, and the tracking controller are stored in a firmware of the optical disk drive.

18. An optical disk drive comprising:

an optical pick-up unit for outputting an incident laser to a track on an optical disk and reading a reflecting laser modulated by the track for generating a tracking error signal and a focusing error signal;

a focusing controller for calculating a focusing driving signal according to the focusing error signal;

a tracking controller for calculating a tracking driving signal according to the tracking error signal;

a memory for storing a noise processing program;

a microprocessor electrically connected to the memory for running the noise processing program to mix a noise with the tracking driving signal to generate a test tracking driving signal; and a servo system electrically connected to the microprocessor and the tracking controller for adjusting a position of the optical pick-up unit corresponding to the optical disk according to the test tracking driving signal and the focusing driving signal.

19. The optical disk drive of claim 18 wherein the focusing controller and the tracking controller are hardware circuits, and are respectively connected to the optical pick-up unit.

20. The optical disk drive of claim 18 wherein the focusing controller and the tracking controller are software programs run by the microprocessor, and the noise processing program, the focusing controller, and the tracking controller are stored in a firmware of the optical disk drive.

* * * * *